Feb. 29, 1944.  R. W. BUSSE  2,342,918
COVER SLIP
Filed Jan. 26, 1942
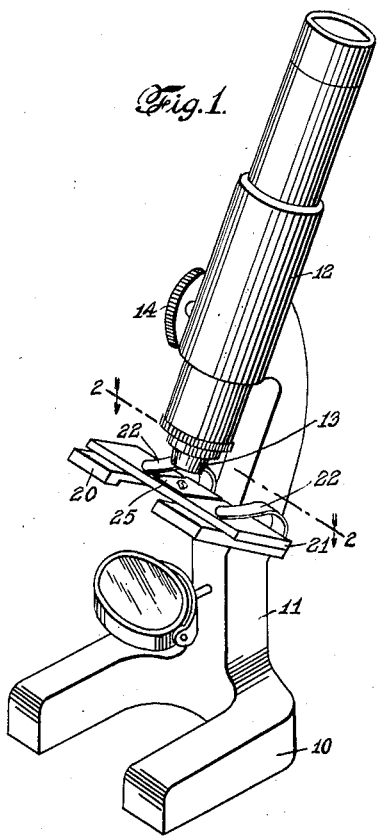
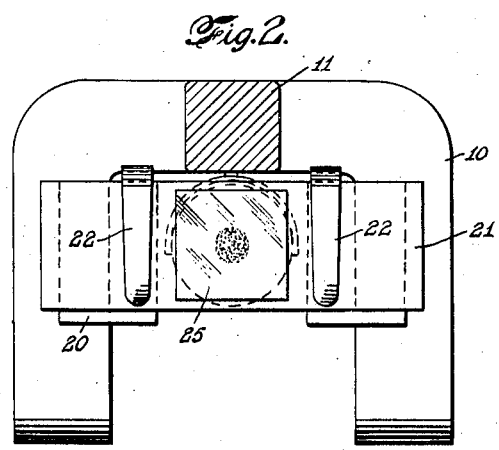
INVENTOR.
ROBERT W. BUSSE
BY
ATTORNEY.

Patented Feb. 29, 1944

2,342,918

UNITED STATES PATENT OFFICE 2,342,918

COVER SLIP

Robert W. Busse, Brooklyn, N. Y.

Application January 26, 1942, Serial No. 428,171

2 Claims. (Cl. 88—40)

This invention relates to cover slips for microscope slides and has for an object to provide a cover slip having non-curling, non-breakable characteristics.

Various other objects and advantages will be apparent as the nature of the invention is more fully disclosed.

Although the novel features which are believed to be characteristic of this invention are pointed out more particularly in the claims appended hereto, the invention may be better understood by referring to the following description, taken in connection with the accompanying drawing in which:

Fig. 1 is a perspective view of a microscope having incorporated therewith a cover slip embodying the present invention; and Fig. 2 is a horizontal section taken on the line 2—2 of Fig. 1.

Referring to the drawing more in detail, the microscope is shown as comprising a base 10, pedestal 11 and lens barrel 12 having an objective 13 which is adjustable vertically by means of an adjusting handle 14. The pedestal 11 carries a platform 20 on which a slide 21 is held by means of clips 22. The slide 21 carries a specimen to be examined which is covered by a rectangular cover slip 25.

This cover slip 25, in accordance with the present invention, is made from a transparent plastic having approximately the same index of refraction as glass and which has dimensional stability, that is, it does not appreciably curl or warp or expand or contract during use and is unbreakable. The slip is preferably made extremely thin, for example, about .005 inch in thickness.

I have found the copolymer of vinyl chloride and vinyl acetate to be suited for the above purpose. Specifically, I use a copolymer containing about 80% of vinyl chloride and 20% of vinyl acetate. This substance is crystal clear, is unaffected by alcohol and may be used for oil immersion slides. It is well adapted to high power microscopes where, due to the proximity of the objective to the slide there is a great tendency for the objective to strike and break the cover slip during adjustment of the microscope.

It is to be understood that the proportions of the vinyl chloride and vinyl acetate may be varied for obtaining a cover slip having the desired characteristics both physical and optical. The material should contain an amount of plasticizer suited to make the same non-breakable during ordinary use and to render the same hard, rigid and non-curling.

Although a specific embodiment has been set forth for purposes of illustration, the invention is not to be restricted thereto but is only to be limited in accordance with the scope of the following claims.

What is claimed is:

1. A non-breakable, non-curling, transparent cover slip for microscope slides, consisting of a plasticizer and a copolymer having about the following composition:

|  | Per cent |
|---|---|
| Vinyl chloride | 80 |
| Vinyl acetate | 20 |

2. A cover slip for microscope slides, consisting of a copolymer of vinyl chloride and vinyl acetate, and a plasticizer in suitable amounts to form a non-breakable, non-curling transparent cover slip having about the same refractive index as glass.

ROBERT W. BUSSE.